(12) United States Patent
Yamamoto (10) Patent No.: US 11,586,400 B2
(45) Date of Patent: Feb. 21, 2023

(54) IMAGE PROCESSING DEVICE AND NON-TRANSITORY COMPUTER-READABLE RECORDING MEDIUM STORING COMPUTER-READABLE INSTRUCTIONS FOR IMAGE PROCESSING DEVICE

(71) Applicant: BROTHER KOGYO KABUSHIKI KAISHA, Nagoya (JP)

(72) Inventor: Ryo Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/644,652

(22) Filed: Dec. 16, 2021

(65) Prior Publication Data

US 2022/0206722 A1  Jun. 30, 2022

(30) Foreign Application Priority Data

Dec. 25, 2020  (JP) .............................. JP2020-217546

(51) Int. Cl.
*G06F 3/12* (2006.01)

(52) U.S. Cl.
CPC ............ *G06F 3/122* (2013.01); *G06F 3/1224* (2013.01); *G06F 3/1288* (2013.01)

(58) Field of Classification Search
CPC ..................................................... G06F 3/122

USPC ........................................................ 358/1.13
See application file for complete search history.

(56) References Cited

U.S. PATENT DOCUMENTS

| 2006/0114498 | A1* | 6/2006 | Yanagi ............... | H04N 1/00244 358/1.15 |
| 2013/0342868 | A1* | 12/2013 | Sugiyama .......... | H04N 1/00244 358/1.15 |
| 2015/0070727 | A1 | 3/2015 | Asada | |
| 2019/0369934 | A1* | 12/2019 | Inoue .................... | G06F 3/1288 |
| 2022/0206732 | A1* | 6/2022 | Yamamoto ............ | G06F 3/1236 |

FOREIGN PATENT DOCUMENTS

JP   2015-054412 A   3/2015

\* cited by examiner

*Primary Examiner* — Jacky X Zheng
(74) *Attorney, Agent, or Firm* — Scully, Scott, Murphy & Presser, PC (57) ABSTRACT

An image processing device may include a controller configured to, in a case where a disabling instruction to cause a service state to shift to a disabled state is obtained under a situation where the service state is an enabled state, shift the service state from the enabled state to the disabled state, and in the case where the disabling instruction is obtained under the situation where the service state is the enabled state, send an acceptance stop instruction to a server. The acceptance stop instruction may be an instruction to cause the server to stop acceptance of a job sending request.

8 Claims, 8 Drawing Sheets

FIG. 8

IMAGE PROCESSING DEVICE AND NON-TRANSITORY COMPUTER-READABLE RECORDING MEDIUM STORING COMPUTER-READABLE INSTRUCTIONS FOR IMAGE PROCESSING DEVICE

CROSS-REFERENCE TO RELATED APPLICATION

This application claims priority to Japanese Patent Application No. 2020-217546, filed on Dec. 25, 2020, the entire contents of which are incorporated herein by reference.

BACKGROUND

A cloud printing system provided with a printer and a server is known. When a print job is added to the server, the printer receives the print job from the server and executes printing therefor.

SUMMARY

The present disclosure discloses an art for diminishing processing load on a server configured to send a job to an image processing device.

An image processing device disclosed herein may include an image processing engine; and a controller. The controller may be configured to, in a case where an enabling instruction is obtained under a situation where a service state of the image processing device for receiving a job providing service from a server is a disabled state, shift the service state from the disabled state to an enabled state. The enabling instruction may be an instruction to cause the service state to shift to the enabled state. The disabled state may be a state incapable of receiving from the server a job which is an execution instruction to execute image processing. The enabled state may be a state capable of receiving the job from the server. The controller may be configured to, in the case where the enabling instruction is obtained under the situation where the service state is the disabled state, send an acceptance instruction to the server. The acceptance instruction may be an instruction to cause the server to execute acceptance of a job sending request. The job sending request may be a request to send the job to the image processing device via the server. The controller may be configured to, in a case where the job is received from the server under a situation where the service state is the enabled state, cause the image processing engine to execute the image processing according to the job. The controller may be configured to, in a case where a disabling instruction to cause the service state to shift to the disabled state is obtained under the situation where the service state is the enabled state, shift the service state from the enabled state to the disabled state. The controller may be configured to, in the case where the disabling instruction is obtained under the situation where the service state is the enabled state, send an acceptance stop instruction to the server. The acceptance stop instruction may be an instruction to cause the server to stop the acceptance of the job sending request.

According to the above-mentioned configuration, in the case where the disabling instruction is obtained, the image processing device sends the acceptance stop instruction to the server. As a result of this, the server stops the acceptance of the job sending request. Due to this, the server may not have to execute a process to generate the job in response to the job sending request. Accordingly, processing load on the server can be diminished.

Computer-readable instructions for the above image processing device, a computer-readable recording medium storing the computer-readable instructions, and a method executed by the image processing device are also novel and useful. A system comprising the above image processing device and the server is also novel and useful.

DETAILED DESCRIPTION

Figure 1:
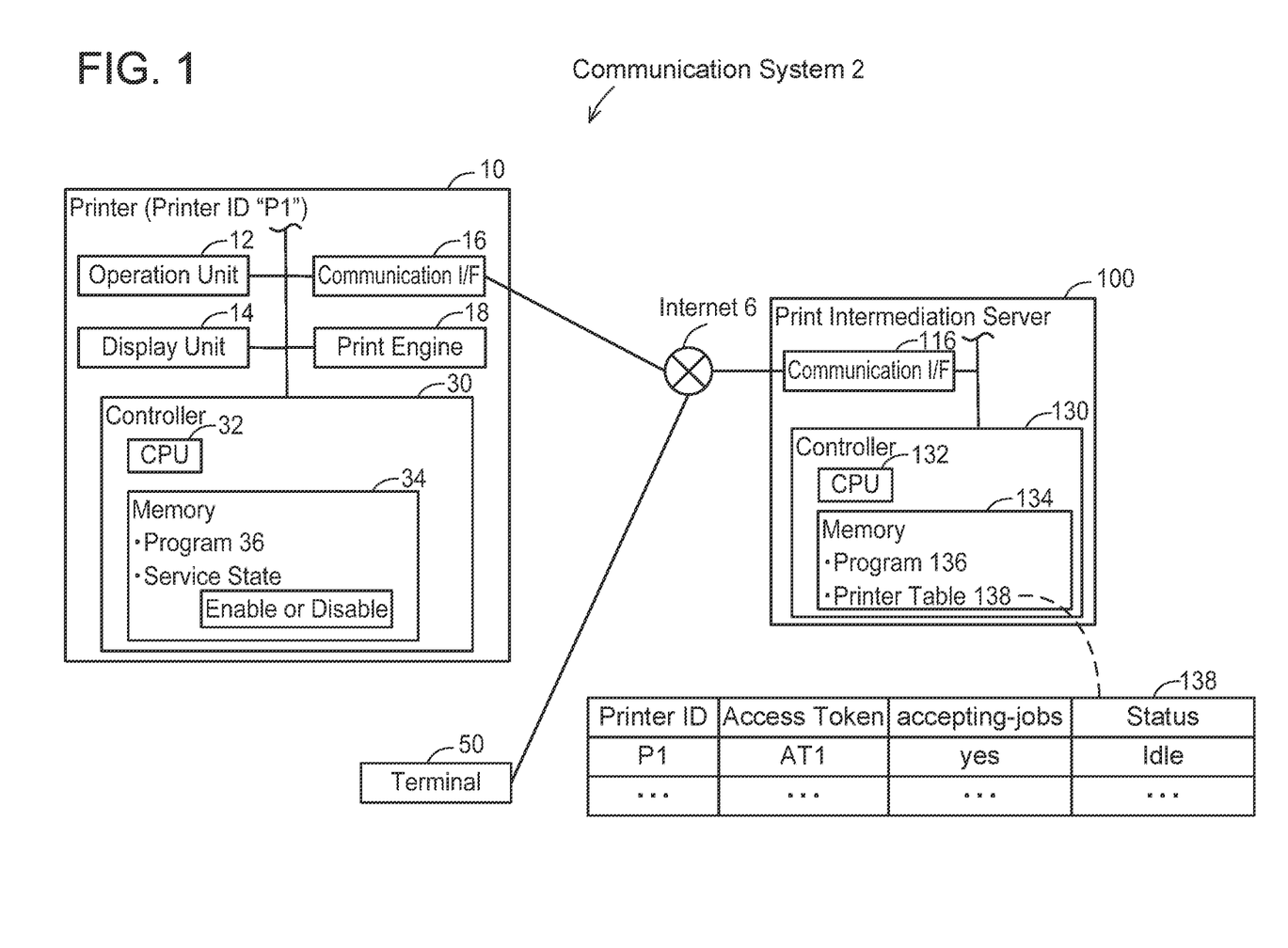
FIG. 1 illustrates a configuration of a communication system.

First Embodiment (Configuration of Communication System; FIG. 1)

As shown in FIG. 1, a communication system 2 comprises a printer 10, a terminal 50, and a print intermediation server 100. The respective devices 10, 50, 100 are connected to Internet 6 and configured capable of communicating with each other through the Internet 6.

(Configuration of Printer 10)

The printer 10 is a peripheral device configured to execute print function (e.g., a peripheral device of the terminal 50). A printer ID "P1" for identifying the printer 10 is assigned to the printer 10. The printer 10 comprises an operation unit 12, a display unit 14, a communication interface 16, a print engine 18, and a controller 30. The respective units 12 to 30 are connected to a bus line (reference sign omitted). Hereinbelow, an interface will be termed "I/F".

The operation unit 12 includes a plurality of keys. A user can input various instructions to the printer 10 by operating the operation unit 12. The display unit 14 is a display for displaying various types of information. The display unit 14 also functions as a touch screen (i.e., operation unit) that accepts instructions from the user. The communication I/F 16 is connected to the Internet 6. The print engine 18 includes a print mechanism of an inkjet scheme, a laser scheme, or the like.

The controller 30 includes a CPU 32 and a memory 34. The CPU 32 is configured to execute various processes according to a program 36 stored in the memory 34. The memory 34 is constituted of a volatile memory, a nonvolatile memory, and the like. The memory 34 further stores a service state for receiving a job providing service (which is in other words cloud print service) according to Internet Printing Protocol (IPP) from the server 100.

The service state indicates either one of "enabled", indicating that the printer 10 can receive a job from the server 100, and "disabled", indicating that the printer 10 cannot receive a job from the server 100. Hereinbelow, a state in which the service state in the memory 34 indicates "enabled" and a state in which the service state in the memory 34 indicates "disabled" may respectively be expressed as "the service state of the printer 10 is in an enabled state" and "the service state of the printer 10 is in a disabled state".

(Configuration of Terminal 50)

The terminal 50 may for example be a portable terminal such as a cellphone, smartphone, PDA, notebook PC, and tablet PC. In a variant, the terminal 50 may be a stationary terminal device such as a desktop PC.

(Configuration of Print Intermediation Server 100)

Hereinbelow, the print intermediation server 100 will be abbreviated as "server 100". The server 100 is a server configured to provide a cloud print service. The server 100 is a server established on the Internet 6 by a business entity (e.g., a business entity that provides the cloud print service) different from a vendor of the printer 10. In a variant, the server 100 may be established by the vendor of the printer 10. The server 100 is configured to generate a job and send this job to the printer 10 when it receives image data from the terminal 50, for example. The job includes print data that is generated by converting the image data into a data format which the printer 10 can interpret.

The server 100 comprises a communication I/F 116 and a controller 130. The respective units 116 and 130 are connected to a bus line (reference sign omitted). The communication I/F 116 is connected to the Internet 6.

The controller 130 includes a CPU 132 and a memory 134. The CPU 132 is configured to execute various processes according to a program 136 stored in the memory 134. The memory 134 is constituted of a volatile memory a nonvolatile memory, and the like. The memory 134 further stores a printer table 138.

The printer table 138 is a table for storing a printer ID, an access token, accepting-jobs, and status in association with each other. The access token is information that is to be used by the server 100 in authentication of the printer 10 upon when a request according to the IPP is communicated between the printer 10 and the server 100. Further, the access token is used for establishing a full-time connection between the printer 10 and the server 100. In the present embodiment, the printer 10 realizes operations such as the full-time connection by using a persistent connection according to Hyper Text Transfer Protocol (HTTP). In a variant, the full-time connection may be a connection according to eXtensible Messaging and Presence Protocol (XMPP). The accepting jobs is information indicating a printer attribute according to the IPP, and specifically, it is information indicating whether or not the server 100 accepts print requests. The accepting-jobs indicates either one of "yes" indicating that the server 100 accepts print requests and "no" indicating that the server 100 does not accept print requests. Here, "accepting print requests" means that the server 100 generates jobs in response to receiving the print requests. "Not accepting print requests" means that the server 100 does not generate jobs despite receiving the print requests. The status indicates a current status of the printer (e.g. Idle, Error).

Figure 2:
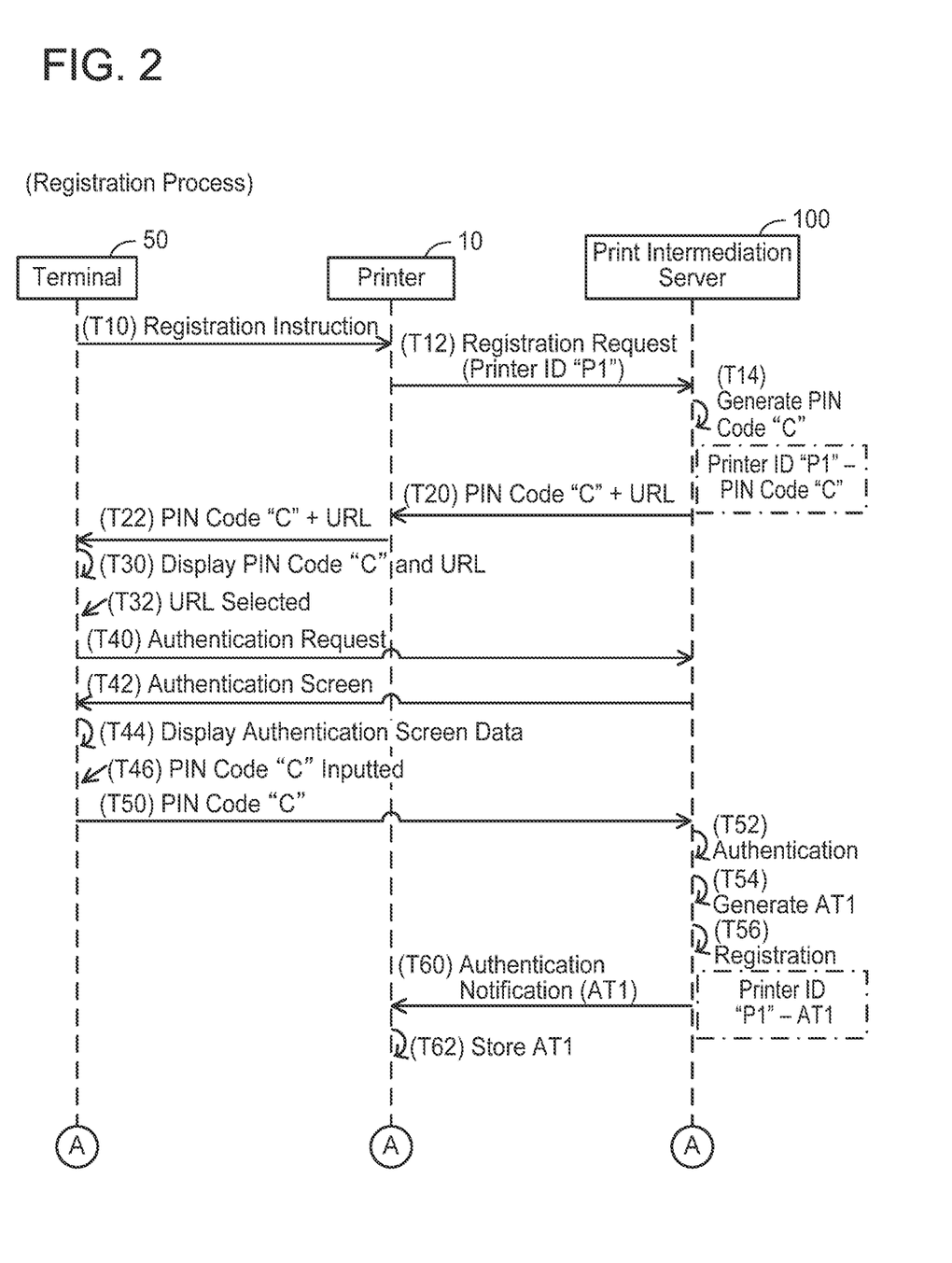
FIG. 2 illustrates a sequence diagram of a registration process.

(Registration Process; FIG. 2)

With reference to FIG. 2, a process for registering information related to the printer 10 in the server 100 in order to receive a cloud printing service from the server 100 will be described. Hereafter, for easier understanding, processes executed by the CPU of each device (e.g., the CPU 32) may hereinafter be described with each device (e.g. the printer 10) as the subject of action, instead of describing each CPU as the subject of action. Further, all the communication performed by the devices 10, 100 is executed via the communication I/Fs 16, 116. Hereafter, the descriptions "via the communication I/F 16 (or 116)" will be omitted.

The terminal 50 accesses a web server within the printer 10 in response to accepting an operation by the user. In T10, the terminal 50 sends a registration instruction to the printer 10 in response to accepting an operation for receiving the cloud printing service from the user.

When the registration instruction is received from the terminal 50 in T10, the printer 10 sends a registration request including the printer ID "P1" to the server 100 in T12.

When the registration request is received from the printer 10 in T12, the server 100 generates a PIN code "C" in T14. In a variant, a password (i.e., a character string) may be generated in T14. Further, the server 100 stores the printer ID "P1" included in the registration request and the generated PIN code "C" in association with each other in the memory 134. Then, in T20, the server 100 sends the PIN code "C" and a login Uniform Resource Locator (URL) to the printer 10. The login URL is information indicating a location of authentication screen data (to be described later) within the server 100.

When the PIN code "C" and the URL are received from the server 100 in T20, the printer 10 sends them to the terminal 50 in T22.

When the PIN code "C" and the URL are received from the printer 10 in T22, the terminal 50 displays them in T30. Then, in T32, when the terminal 50 accepts user's operation of selecting the URL, it sends an authentication request including the URL to the server 100 in T40.

When the authentication request is received from the terminal 50 in T40, the server 100 sends authentication screen data specified by the URL included in the authentication request to the terminal 50 in T42. The authentication screen data is data representing an authentication screen for inputting a PIN code.

When the authentication screen data is received from the server 100 in T42, the terminal 50 displays the authentication screen in T44. Then in T46, the terminal 50 accepts user's input of the PIN code "C" that was displayed in T30. In this case, the terminal 50 sends the inputted PIN code "C" to the server 100 in T50.

When the PIN code "C" is received from the terminal 50 in T50, the server 100 executes authentication of the received PIN code "C" in T52. Specifically, the server 100 determines whether or not the received PIN code "C" is already stored. In a case of determining that the received PIN code "C" is already stored, that is, in a case where the authentication is successful, the server 100 generates an access token AT1 which is a unique character string in T54. Then, in T56, the server 100 stores the generated access token AT1 in the printer table 138 in association with the printer ID "P1" that was stored in T14. After this, in T60, the server 100 sends an authentication notification including the generated access token AT1 to the printer 10.

When the authentication notification is received from the server 100 in T60, the printer 10 stores the access token AT1 included in the authentication notification in the memory 34 in T62.

Figure 3:
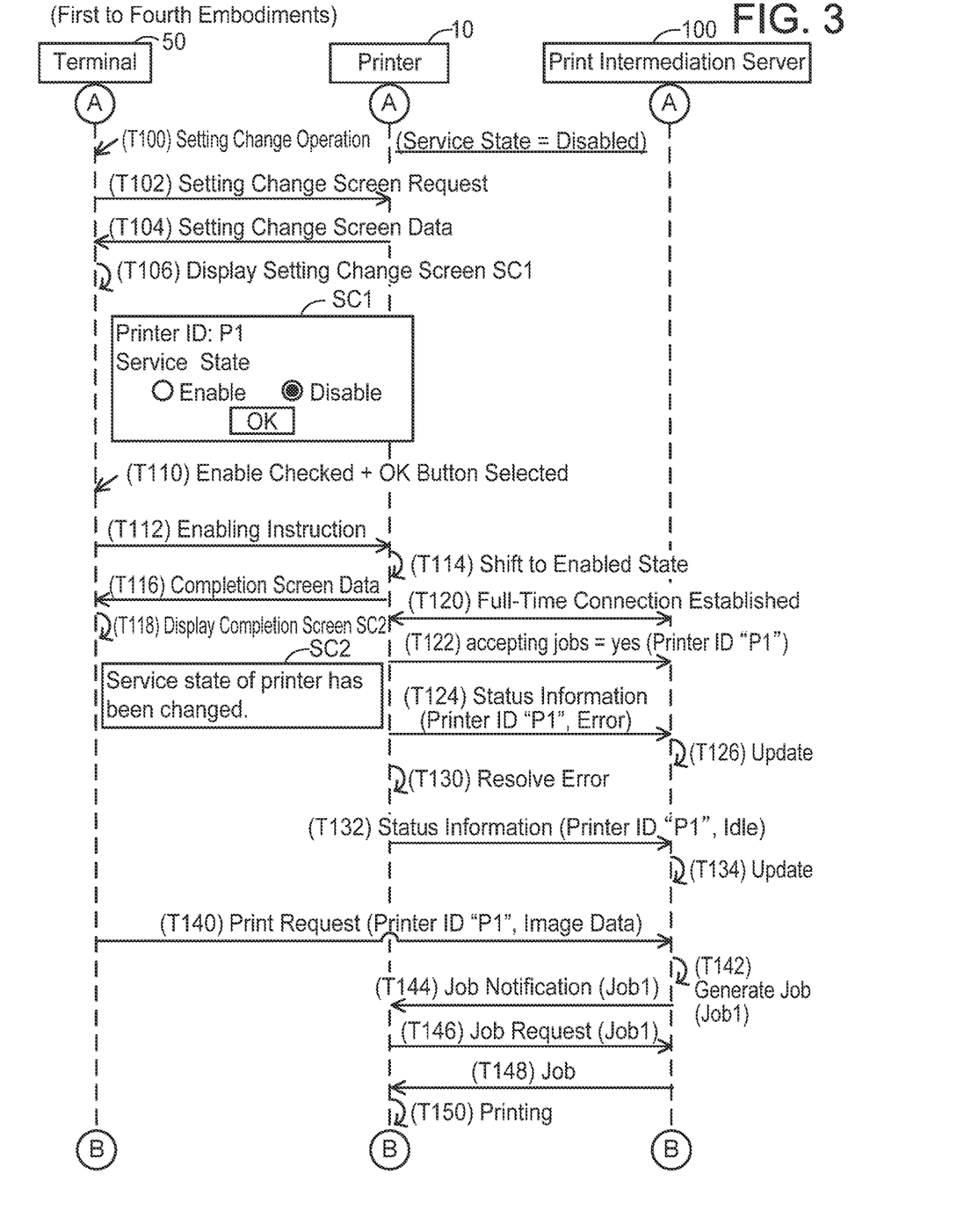
FIG. 3 illustrates a sequence diagram continued from FIG. 2.

(Specific Case; FIG. 3)

FIG. 3 is a continuation of FIG. 2, and specifically, is a case in which the service state of the printer 10 is shifted from the disabled state to the enabled state.

The terminal 50 accesses the web server in the printer 10 in response to accepting the operation from the user. Then, in response to accepting a setting change operation from the user in T100, the terminal 50 sends a setting change screen request to the printer 10 in T102.

When the printer 10 receives the setting change screen request from the terminal 50 in T102, the printer 10 sends setting change screen data indicating a setting change screen SC1 to the terminal 50 in T104.

When the terminal 50 receives the setting change screen data from the printer 10 in T104, the terminal 50 displays the setting change screen SC1 in T106. The setting change screen SC1 is a screen for changing the service state of the printer, and includes the printer ID "P1", a check box for setting the service state to be enabled, a check box for setting the service state to be disabled, and an OK button. Because the service state of the printer 10 is the disabled state at present, the check box "disable" is checked in the setting change screen SC1.

After the terminal 50 has accepted an operation of checking the check box "enable" within the setting change screen SC1 from the user in T110, the terminal 50 accepts a selection of the OK button. In this case, the terminal 50 sends an enabling instruction to the printer 10 in T112.

When the enabling instruction is received from the terminal 50 in T112, the printer 10 shifts the service state from the disabled state to the enabled state in T114. Specifically, the printer 10 changes the service state in the memory 34 from the disabled state to the enabled state. Then in T116, the printer 10 sends completion screen data representing a completion screen SC2 to the terminal 50

When the completion screen data is received from the printer 10 in T116, the terminal 50 displays the completion screen SC2 in T118. The completion screen SC2 includes a message indicating that the service state of the printer 10 has been changed. Due to this, the user can acknowledge by seeing the completion screen SC2 that the change of the service state of the printer 10 has been completed.

When the printer 10 has shifted to the enabled state in T114, the printer 10 establishes a full-time connection with the server 100 by using the stored access token AT1 (see T62 of FIG. 2) in T120. With the full-time connection, the server 100 can send a signal to the printer 10 beyond a firewall of a LAN to which the printer 10 belongs even without receiving a request from the printer 10. That is, the full-time connection is a connection by which a server-push type communication is doable. The full-time connection is maintained until the service state of the printer 10 is shifted to the disabled state.

Subsequently, in T122, the printer 10 sends a command including the printer ID "P1" to the server 100. The present command is a command for registering "yes" as accepting-jobs in the server 100. Further, in T124, the printer 10 sends status information indicating a current status of the printer 10 to the server 100. The status information includes the printer ID "P1" and information indicating that an error is occurring in the printer 10 (i.e., Error).

The server 100 receives the command from the printer 10 in T122, and receives the status information from the printer 10 in T124. In this case, in T126, the server 100 updates the printer table 138. Specifically, the server 100 stores "yes" as accepting-jobs in association with the printer ID "P1" included in the command of T122. Further, the server 100 stores the status "Error" in association with the printer ID "P1".

Thereafter, when the error of the printer 10 is resolved in T130, the printer 10 sends the status information indicating that the printer 10 is in a standby state (i.e., Idle) to the server 100 in T132. A process of T134 is the same as the process of T126 except that "Idle" is stored in place of "Error".

Thereafter, in T140, the terminal 50 sends the print request to the server 100 in response to accepting an instruction including designation of a printer to execute print (the printer 10 in the present case) and designation of an image to be printed. The print request includes the printer ID "P1" for identifying the printer 10 designated by the user and image data representing the image to be printed.

When the print request is received from the terminal 50 in T140, the server 100 specifies the printer ID "P1" included in the same request from the printer table 138. Then, the printer 10 identifies whether accepting jobs associated with the printer ID "P1" indicates "yes" or "no" in the printer table 138. In the present case, because accepting jobs associated with the printer ID "P1" indicates "yes", the server 100 accepts the print request. That is, in T142, the server 100 generates a job identified by the job ID "Job1". Specifically, the server 100 firstly converts the image data received from the terminal 50 and generates print data having a data format which the printer 10 can interpret. Then the server 100 stores the printer ID "P1", the job ID "Job1", and the print data in association with each other in the memory 134. Thereafter, in T144, the server 100 sends a job notification indicating that the job has been generated, by using the full-time connection. The job notification herein includes the job ID "Job1" of the job generated in T142.

When the job notification is received from the server 100 in T144, the printer 10 sends a job request including the job ID "Job1" to the server 100 in T146.

When the job request is received from the printer 10 in T146, the server 100 specifies print data stored in association with the job ID "Job1" included in the job request. Then in T148, the server 100 sends the job including the print data to the printer 10.

When the job including the print data is received from the server 100 in T148, the printer 10 executes printing of the image represented by the printing data in T150. Thus, in a situation in which the service state of the printer 10 is the enabled state, the printer 10 can execute the printing of image(s) by using the cloud printing service.

Figure 4:
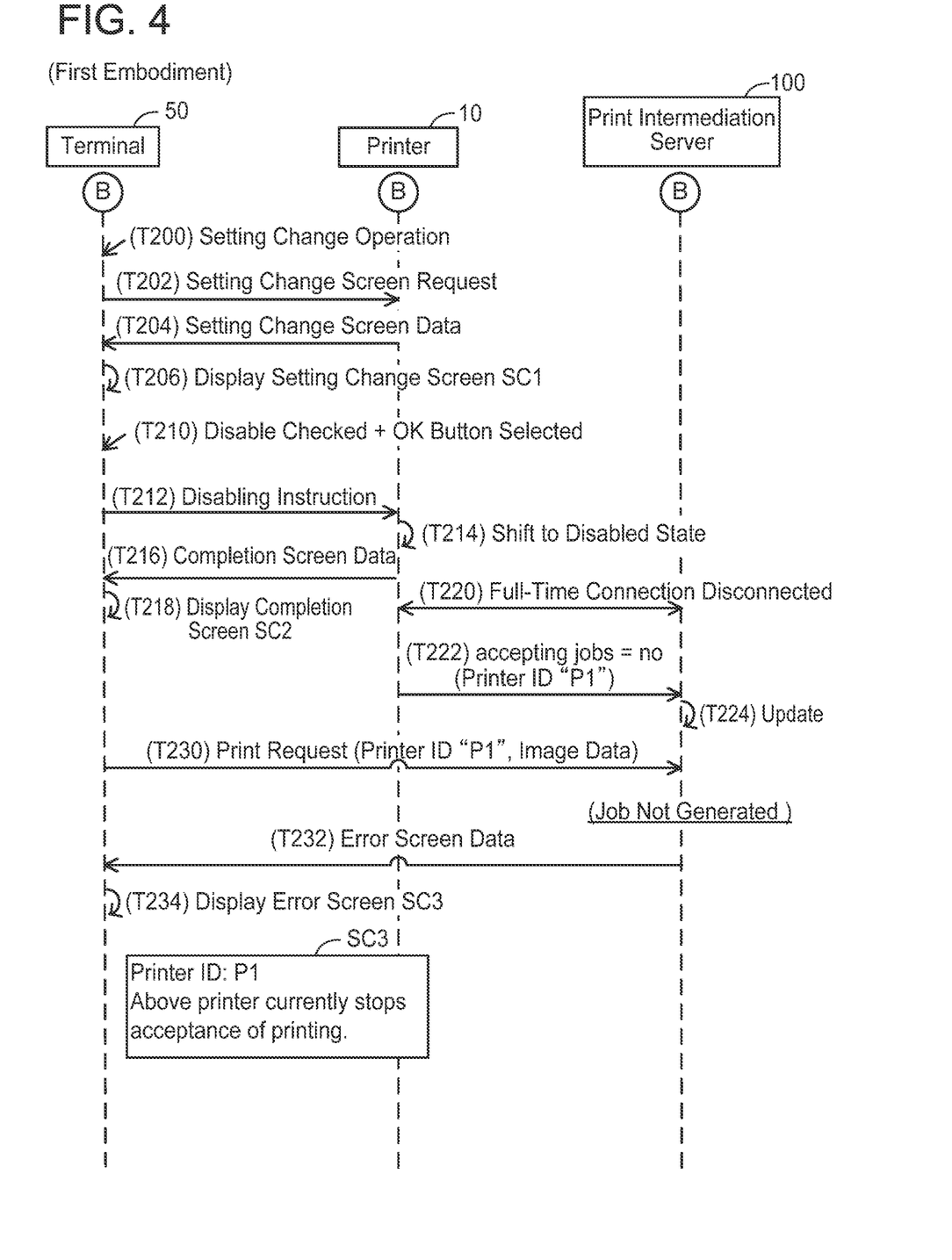
FIG. 4 illustrates a sequence diagram of a first embodiment.

(Continuation of FIG. 3; FIG. 4)

FIG. 4 is a continuation of FIG. 3, and specifically is a case in which the service state of the printer 10 is shifted from the enabled state to the disabled state. Processes of T200 to T206 in FIG. 4 are the same as the processes of T100 to T106 in FIG. 3. Although not illustrated, because the service state of the printer 10 is the enabled state (see T114 of FIG. 3), the check box "enable" is checked in the setting change screen SC1 displayed in T206.

After accepting an operation of checking the check box "disable" within the setting change screen SC1 from the user in T210, the terminal 50 accepts selection of the OK button. In this case, in T212, the terminal 50 sends a disabling instruction to the printer 10.

When the disabling instruction is received from the terminal 50 in T212, the printer 10 shifts the service state from the enabled state to the disabled state in T214. Specifically, the printer 10 changes the service state in the memory 34 from the enabled to the disabled. Processes of T216 and T218 are the same as the processes of T116 and T118 in FIG. 3. Further, when the printer 10 shifts to the disabled state in T214, the printer 10 disconnects the full-time connection with the server 100 (see T120 in FIG. 3) in T220. Due to this, various types of communication for maintaining the full-time connection between the printer 10 and the server 100 does not have to be performed. As a result of this, communication load between the printer 10 and the server 100 is reduced.

Subsequently, in T222 the printer 10 sends a command including the printer ID "P1" to the server 100. The command herein is a command for registering "no" as accepting-jobs in the server 100.

When the server 100 receives the command from the printer 10 in T222, the server 100 updates the printer table 138 in T224. Specifically, the server 100 stores "no" in place of "yes" as accepting-jobs in association with the printer ID "P1" included in the command of T222. As a result of this, the server 100 stops the acceptance of print requests for causing the printer 10 to execute printing.

A process of T230 is the same as the process of T140 in FIG. 3. Because the server 100 has stopped the acceptance of the print request, the server 100 does not generate a job even when the server 100 receives the print request from the terminal 50. Then, in T232 the server 100 sends error screen data representing an error screen SC3 to the terminal 50.

When the terminal 50 receives the error screen data from the server 100 in T232, in T234 the terminal 50 displays the error screen SC3. The error screen SC3 includes the printer ID "P1" and a message indicating that the acceptance of the print request has been stopped. Due to this, the user can acknowledge that the printer 10 cannot use the cloud printing service, by seeing the error screen SC3.

According to the above configuration, in a case where the printer 10 obtains the disabling instruction from the terminal 50 (T212 in FIG. 4), the printer 10 registers "no" as accepting-jobs in the server 100 (T222). As a result of this, the server 100 stops the acceptance of print requests. Accordingly, a situation in which despite the service state of the printer 10 having been shifted to the disabled state, thereby the full-time connection between the printer 10 and the server 100 being disconnected (i.e., despite the server 100 being unable to send the job notification to the printer 10), the server 100 generates a job in response to accepting the print request from the server 100 can be suppressed from occurring. Since the server 100 does not have to accept the print request to generate a job, processing load on the server 100 can be diminished.

(Correspondence Relationship)

The printer 10 and the print intermediation server 100 are an example of "image processing device" and "server", respectively. The print engine 18 is an example of "image processing engine". The command sent in T122 in FIG. 3 and the command sent in T222 in FIG. 4 are an example of "acceptance instruction" and "acceptance stop instruction", respectively. The print request sent in T140 of FIG. 3 (print request sent in T230 of FIG. 4) is an example of "job sending request". The status information sent in T124 of FIG. 3 and the status information sent in T132 in FIG. 3 are an example of "first status information" and "second status information", respectively. The printing executed in T150 in FIG. 3 is an example of "image processing".

The process of T114, the process of T122, the process of T124, the process of T132, and the process of T150 in FIG. 3 are an example of "shift the service state from the disabled state to an enabled state", "send an acceptance instruction", "send first status information", "send second status information", and "cause the image processing engine to execute the image processing", respectively. The process of T214 and the process of T222 in FIG. 4 are an example of "shift the service state from the enabled state to the disabled state" and "in the case where the disabling instruction is obtained under the situation where the service state is the enabled state, send an acceptance stop instruction", respectively.

Figure 5:
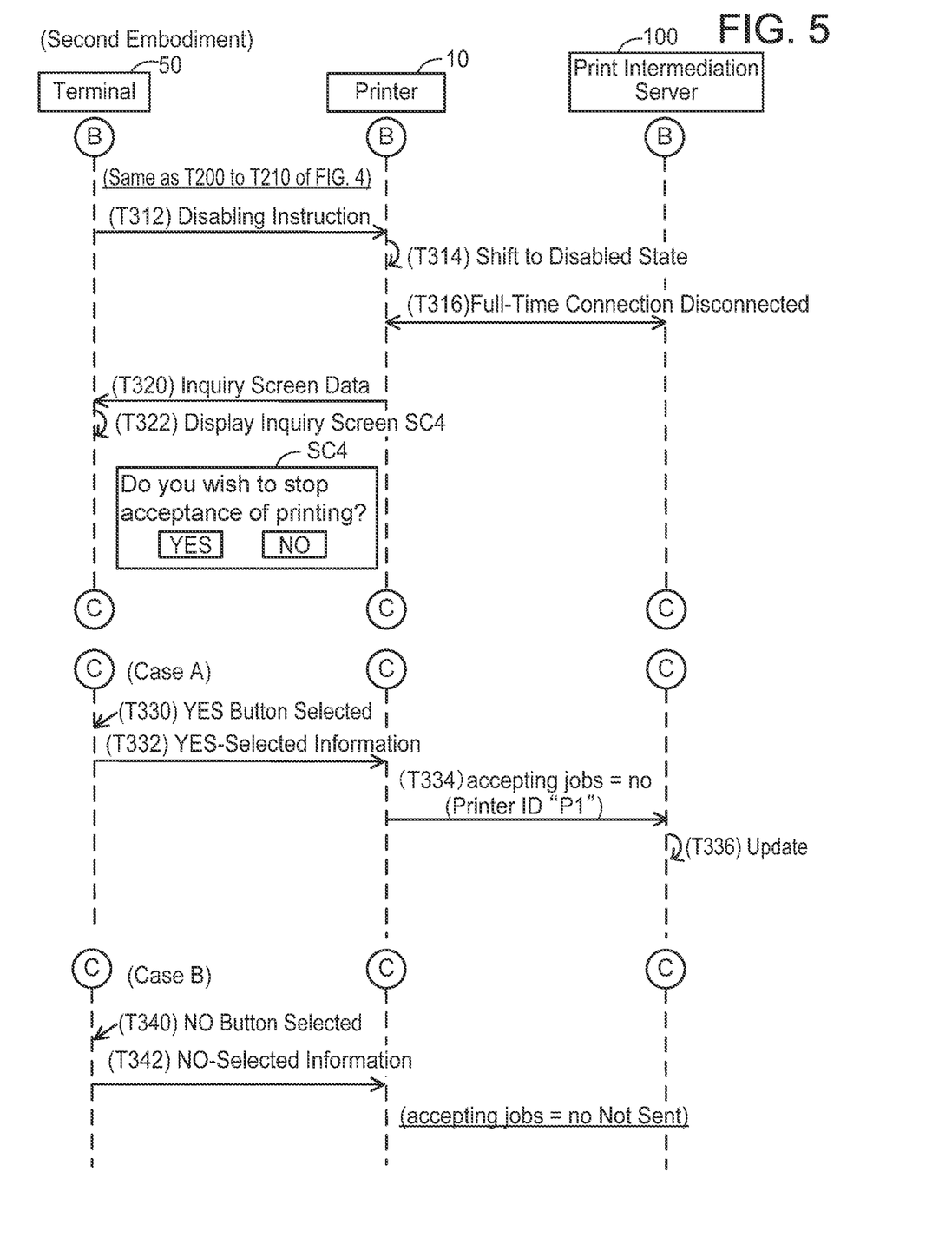
FIG. 5 illustrates a sequence diagram of a second embodiment.

Second Embodiment; FIG. 5

With reference to FIG. 5, a second embodiment will be described. The second embodiment is different from the first embodiment in that the printer 10 sends inquiry screen data to the terminal 50 in response to obtaining the disabling instruction. FIG. 5 is a continuation of FIG. 3. In FIG. 5, firstly processes same as T200 to T210 in FIG. 4 are executed. As a result of this, in T312 the terminal 50 sends the disabling instruction to the printer 10.

When the printer 10 receives the disabling instruction from the terminal 50 in T312, in T314 the printer 10 shifts the service state from the enabled state to the disabled state. Further, when the printer 10 has shifted to the disabled state in T314, the printer 10 disconnects the full-time connection with the server 100 (see T120 in FIG. 3) in T316. Subsequently, in T320, the printer 10 sends inquiry screen data representing an inquiry screen SC4 to the terminal 50.

When the inquiry screen data is received from the printer 10 in T320, the terminal 50 causes a display unit of the terminal 50 to display the inquiry screen SC4 in T322. The inquiry screen SC4 includes a message for inquiring whether to stop the acceptance of print requests or not, an YES button, and a NO button.

Second Embodiment; Case A

In case A, in T330, the terminal 50 accepts selection of the YES button within the inquiry screen SC4. In this case, in T332, the terminal 50 sends YES-selected information indicating that the YES button has been selected to the printer 10.

When the YES-selected information is received from the terminal 50 in T332, the printer 10 sends a command for registering "no" as the accepting-jobs to the server 100 in T334. Due to this, in the server 100, the printer table 138 is updated (i.e., "no" is registered as the accepting-jobs) (T336), and the acceptance of print requests is stopped.

Second Embodiment; Case B

Contrary to the above, in case B, the terminal 50 accepts selection of the NO button within the inquiry screen SC4 in T340. In this case, in T342, the terminal 50 sends NO-selected information indicating that the NO button within the inquiry screen SC4 has been selected to the printer 10

When the NO-selected information is received from the terminal 50 in T342, the printer 10 does not send the command for registering "no" as the accepting-jobs to the server 100. As a result of this, although the service state of the printer 10 is changed to the disabled state, the acceptance of print requests continues in the server 100.

Thus, in the case where the printer 10 obtains the disabling instruction (T312 of FIG. 5), the printer 10 sends the inquiry screen data to the terminal 50 (T320). As a result of this, the terminal 50 displays the inquiry screen SC4 (T322). Due to this, the user can select whether to stop the acceptance of print requests in the inquiry screen SC4.

The user can select whether to stop the acceptance of print requests according to, for example, whether a duration for which the service state of the printer 10 is to be maintained in the disabled state is relatively short or relatively long. In the case where the duration for which the service state of the printer 10 is to be maintained in the disabled state is relatively short (e.g., maintenance work of the printer 10), the user may select the NO button within the inquiry screen SC4 to maintain the acceptance of print requests. Due to this, after the service state has been re-shifted to the enabled state, the printer 10 can execute the printing according to the print request(s) which the server 100 received while the service state was in the disabled state. Further, in the case where the duration for which the service state of the printer 10 is to be maintained in the disabled state is relatively long (e.g., a long-term closure of an office in which the printer 10 is located), the user may select the YES button within the inquiry screen SC4 to stop the acceptance of print requests. Due to this, processing load on the server 100 can be diminished.

(Correspondence Relationship)

The inquiry screen SC4 is an example of "first inquiry screen". The display unit of the terminal 50 is an example of "display unit". The process of T320 in FIG. 5 is an example of "cause a display unit to display a first inquiry screen".

Figure 6:
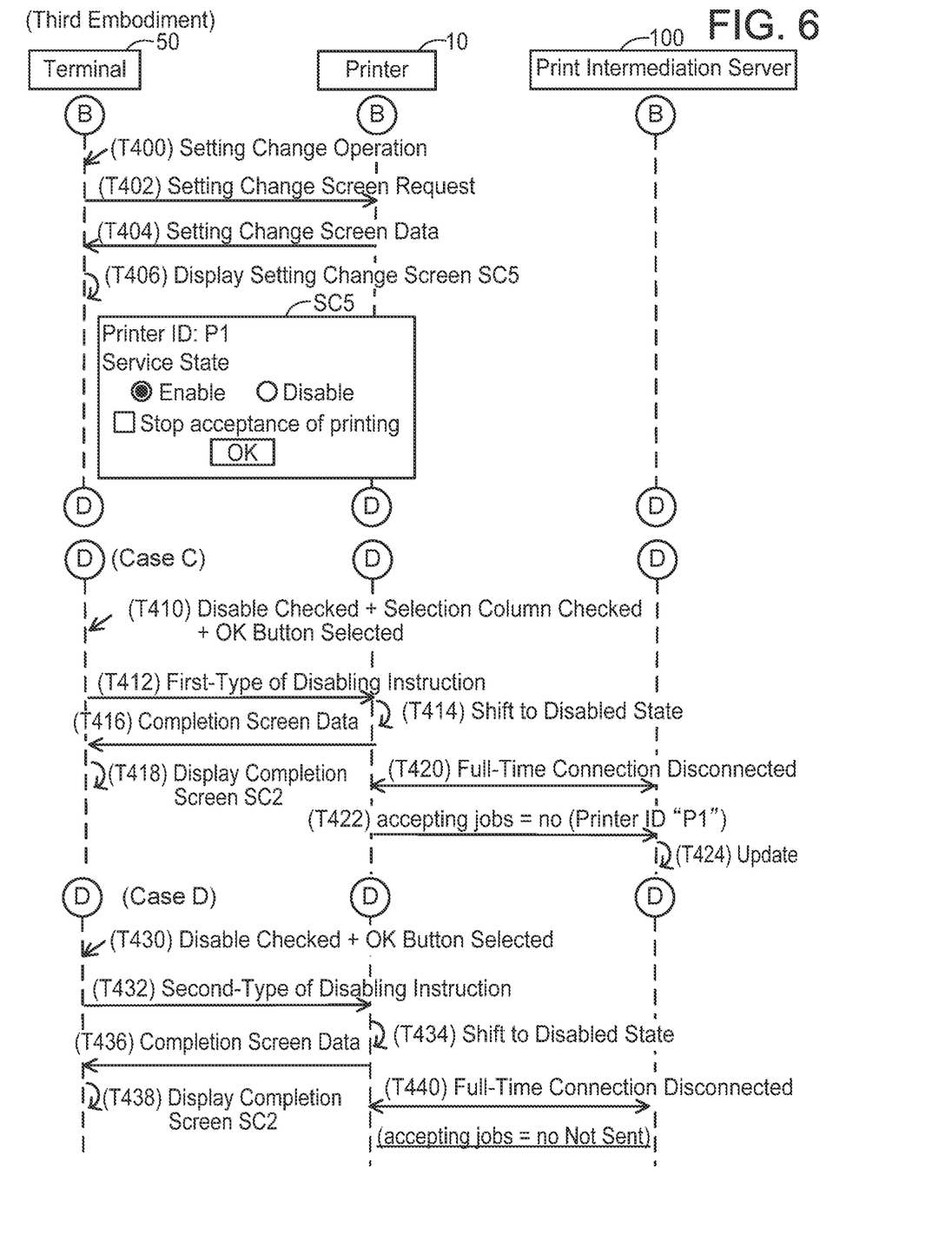
FIG. 6 illustrates a sequence diagram of a third embodiment.

Third Embodiment; FIG. 6

Subsequently, with reference to FIG. 6, a third embodiment will be described. The third embodiment is different from the first embodiment in that a setting change screen includes an inquiry. FIG. 6 is a continuation of FIG. 3. Processes of T400 and T402 in FIG. 6 are the same as the processes of T100 and T102 in FIG. 3.

The printer 10 sends setting change screen data representing a setting change screen SC5 to the terminal 50 in T404. That is, the setting change screen data sent in T404 differs from the setting change screen data sent in T104 in FIG. 3.

When the terminal 50 receives the setting change screen data from the printer 10 in T404, the terminal 50 displays the setting change screen SC5 in T406. The setting change screen SC5 includes a selection column for selecting whether the acceptance of the print request is to be stopped in addition to the items included in the setting change screen SC1 (see T106 of FIG. 3).

Third Embodiment; Case C

In case C, the terminal 50 accepts selection of the OK button after accepting an operation of checking a check box "disable" within the setting change screen SC5 and an operation of checking the selection column from the user in T410. In this case, in T412, the terminal 50 sends a first type of disabling instruction to the printer 10. The first type of disabling instruction includes an instruction for shifting the service state of the printer 10 the disabled state and for requesting the printer 10 to register "no" as accepting-jobs in the server 100. Processes of T414 to T424 are the same as the processes of T214 to T224 in FIG. 4.

Third Embodiment; Case D

Contrary to this, in case D, the terminal 50 accepts the selection of the OK button after accepting the operation of checking the check box "disable" within the setting change screen SC5 from the user without accepting the operation of checking the selection column, in T430. In this case, the terminal 50 sends a second type of disabling instruction to the printer 10 in T432. The second type of disabling instruction includes an instruction for shifting the service state of the printer 10 to the disabled state, but does not include the instruction for requesting the printer 10 to register "no" as accepting-jobs in the server 100. Processes of T434 to T440 are the same as the processes of T214 to T220 in FIG. 4. The printer 10 does not register "no" as accepting-jobs in the server 100. As a result of this, although the service state of the printer 10 is changed to the disabled state, accepting-jobs in the printer table 138 is maintained in "yes".

Thus, the printer 10 sends the setting change screen data to the terminal 50 (T404 in FIG. 6) before the printer 10 obtains the disabling instruction. As a result of this, the terminal 50 displays the setting change screen SC5 including the selection column for selecting whether the acceptance of the print request is to be stopped or not (T406). Due to this, in the setting change screen SC5, the user can select whether to stop the acceptance of the print request or not.

(Correspondence Relationship)

The setting change screen SC5 is an example of "second inquiry screen". The process of T404 in FIG. 6 is an example of "cause a display unit to display a second inquiry screen". Checking of the selection column within the setting change screen SC5 is an example of "the first-type of disabling instruction being selected in the second inquiry screen". Not checking of the selection column within the setting change screen SC5 is an example of "second-type of disabling instruction being selected in the second inquiry screen".

Figure 7:
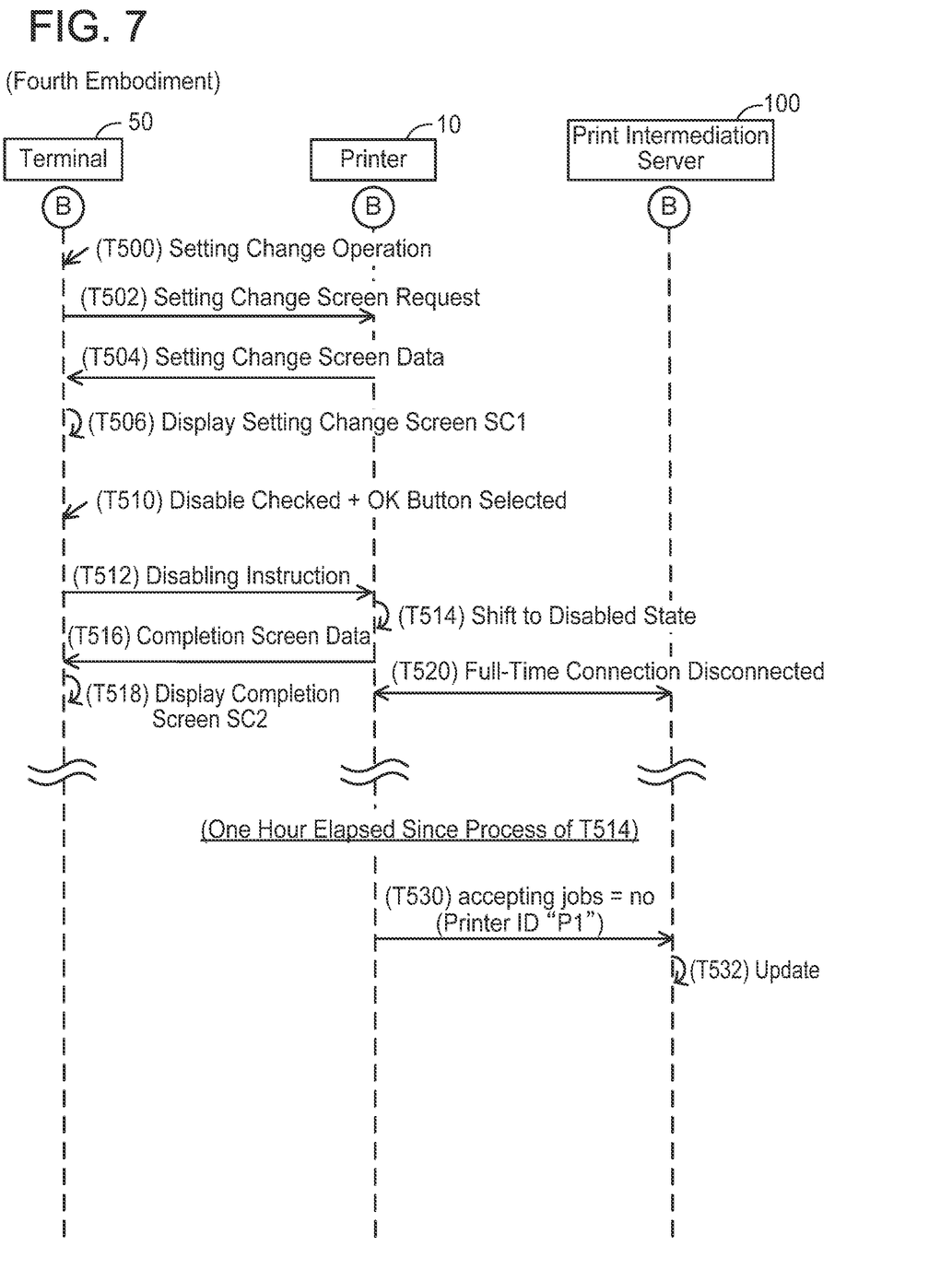
FIG. 7 illustrates a sequence diagram of a fourth embodiment.

Fourth Embodiment; FIG. 7

Subsequently, with reference to FIG. 7, a fourth embodiment will be described. The fourth embodiment is different from the first embodiment in its timing when the printer 10 sends a command for registering "no" as accepting-jobs in the server 100. FIG. 7 is a continuation of FIG. 3. Processes of T500 to T520 in FIG. 7 are the same as the processes of T200 to T220 in FIG. 4.

The printer 10 does not register "no" as accepting-jobs in the server 100 immediately after the full-time connection has been disconnected. Thereafter, the printer 10 monitors one hour elapsing without obtaining the enabling instruction, and when one hour has passed, in T530, the printer 10 registers "no" as accepting-jobs in the server 100. Processes of T530 and T532 are the same as the processes of T222 and T224 in FIG. 4. Here, "one hour" in the present embodiment is an example, and may be shorter than one hour or may be longer than one hour. Further, a duration for which the printer 10 monitors for obtaining the enabling instruction may be set by the user. For example, the user may set the duration for which the printer 10 monitors for obtaining the enabling instruction by way of the setting change screen SC1.

Thus, in a case where the printer 10 does not obtain the enabling instruction over one hour since the service state of the printer 10 was shifted to the disabled state, the printer 10 registers "no" as accepting-jobs in the server 100 (T530 in FIG. 7). Due to this, only in a case where a duration for which the service state of the printer 10 is maintained in the disabled state is relatively long, the acceptance of the print request can be stopped in the server 100. One hour is an example of "predetermined time".

Figure 8:
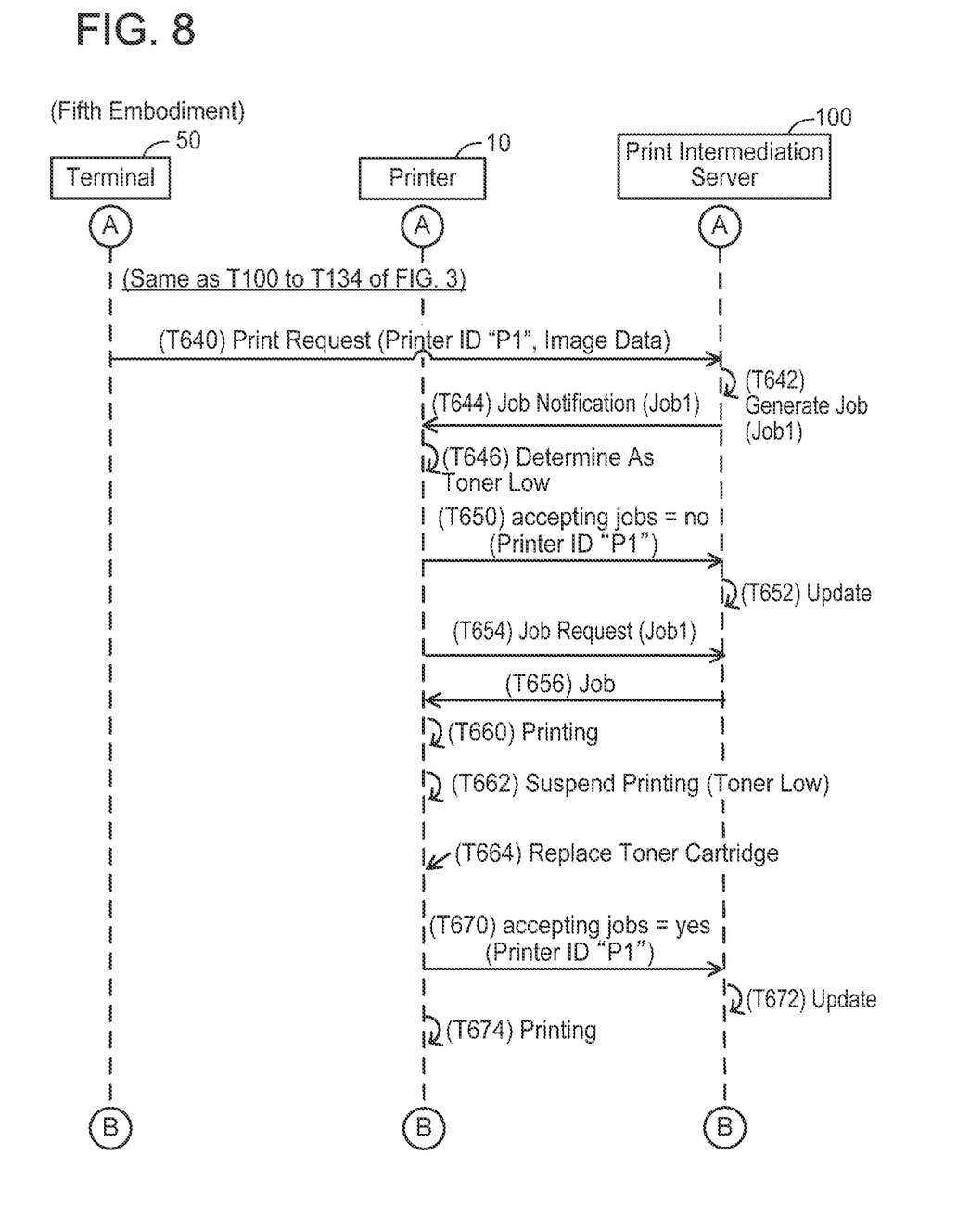
FIG. 8 illustrates a sequence diagram of a fifth embodiment.

Fifth Embodiment; FIG. 8

Subsequently, with reference to FIG. 8, a fifth embodiment will be described. The fifth embodiment is different from the first embodiment in that even when the service state of the printer 10 is not shifted to the disabled state, the printer 10 registers "no" as accepting-jobs in the server 100. FIG. 8 is a continuation of FIG. 2. In FIG. 8, firstly processes same as T100 to T134 in FIG. 3 are executed. Further, processes of T640 to T644 are the same as the processes of T140 to T144 in FIG. 3.

When the printer 10 receives a job notification from the server 100 in T644, the printer 10 determines whether there is sufficient toner for executing print or not. Specifically, firstly the printer 10 estimates a toner amount necessary for printing according to one job. The printer 10 estimates the toner amount necessary for printing according to one job by calculating an average value for a toner amount actually used for printing according to one job based on a plurality of jobs for which printing was executed in the past. In a variant, the printer 10 may store an estimated value for the toner amount necessary for printing according to one job in advance. Then, the printer 10 determines whether the estimated toner amount is equal to or less than a toner remaining amount within a toner cartridge mounted on the printer 10. Hereafter, a case will be described in which the toner remaining amount of the toner cartridge in the printer 10 is two percent, and the toner amount necessary for printing per one job is five percent. In the present case, (necessary toner amount: five percent)>(toner remaining amount: two percent) is satisfied, and accordingly in T646 the printer 10 determines that the toner for executing printing will be insufficient.

When the printer 10 determines that the toner for execution of print will be insufficient in T646, the printer 10 sends a command for registering "no" as accepting jobs to the server 100 in T650. Processes of T650 and T652 are the same as the processes of T222 and T224 in FIG. 4. Further, processes of T654 to T660 are the same as the processes of T146 to T150 in FIG. 3.

In T662, the printer 10 suspends the printing of the job due to the toner becoming insufficient. Thereafter, in T664, the toner cartridge mounted on the printer 10 is replaced with a new toner cartridge. In this case, the printer 10 sends a command for registering "yes" as accepting-jobs to the server 100 in T670. A process of T670 is the same as the process of T122 in FIG. 3. Further, a process of T672 is the same as the process of T126 in FIG. 3 except that the status information is not stored. Further, because the toner cartridge is replaced with the new toner cartridge (see T664), in T674 the printing which was suspended in T662 is restarted.

Even if it is determined that the toner will be insufficient, thereafter the server 100 continues to accept the print request and keeps generating job(s) while the command of T650 is not sent. That results in the server 100 continuing to generate the job(s) for which the printer 10 highly likely cannot execute printing. In the present embodiment, in a case where it is determined that the toner will be insufficient (T646 in FIG. 8), the printer 10 sends the command of T650 to the server 100. Due to this, the server 100 does not have to generate the job(s) for which the printer 10 highly likely cannot execute printing. Accordingly, processing load on the server 100 can be diminished.

(Correspondence Relationship)

The toner is an example of "predetermined resource". The determination in T646 that the toner is insufficient is an example for "a predetermined condition is satisfied". The process of T650 in FIG. 8 is an example of a process performed by "in a case where a predetermined condition is satisfied even without the disabling instruction being obtained under the situation where the service state is the enabled state, send the acceptance stop instruction".

(Variant 1) In each of the above-mentioned embodiments, when the service state of the printer 10 is shifted to the enabled state, a full-time connection is established between the printer 10 and the server 100 (see T120 in FIG. 3 for example). Then, the server 100 uses the full-time connection to send the job notification to the printer 10 (see T144 for example). Alternatively, instead of establishing the full-time connection, the printer 10 may shift into a state in which the printer 10 sends polling periodically to the server 100. In this case, in a case where the server 100 receives the polling from the printer 10, the server 100 may send a job to the printer 10 as its response. In the present variant, the state of sending polling and a state of not sending polling are an example of "enabled state" and "disabled state", respectively.

(Variant 2) The printer 10 may be a multi-function peripheral configured capable of performing a scan function, a facsimile function, and the like. Further, although in each of the above embodiments, the job provision service for causing the printer 10 to execute printing is described, in a variant, the job provision service may be a job provision service for causing the multi-function peripheral to execute a facsimile transmission. In the present variant, the facsimile transmission is an example of the "image processing", and an engine configured to execute the facsimile transmission is an example of the "image processing engine". Further, in another variant, the job provision service may be a job provision service for instructing the multi-function peripheral to execute a scan. In the present variant, the execution of scan is an example of the "image processing", and an engine configured to execute a scan is an example of the "image processing engine".

(Variant 3) Instead of the process of T320 in FIG. 5, the printer 10 may cause the display unit 14 of the printer 10 to display the inquiry screen SC4. In the present variant, the process of T322 may be omitted. In the present variant, the displaying of the inquiry screen SC4 is an example of "cause a display unit to display a first inquiry screen", and the display unit 14 of the printer 10 is an example of the "display unit". Further, instead of the process of T404 in FIG. 6, the printer 10 may cause the display unit 14 of the printer 10 to display the setting change screen SC5. In the present variant, the process of T406 may be omitted. In the present variant, the displaying of the setting change screen SC5 is an example of "cause a display unit to display a second inquiry screen", and the display unit 14 of the printer 10 is an example of the "display unit".

(Variant 4) The printer 10 may not send the status information of the printer 10 to the server 100. In the present variant, the processes of T124 and T132 in FIG. 3 may be omitted. Generally speaking, "send first status information" and "send second status information" may be omitted.

(Variant 5)

Instead of the process of T646, the printer 10 may determine whether a capacity of the memory 34 of the printer 10 for storing print data is sufficient or not. In the present variant, the memory of the printer is an example of "predetermined resource", and the determination that the capacity of the memory 34 of the printer 10 is insufficient is an example of the "predetermined condition" being satisfied. In another variant, instead of the process of T646, the printer 10 may determine whether printing medium (that is, a number of sheets installed in the printer 10) on which printing is to be executed is sufficient or not. In the present variant, the printing medium installed in the printer 10 is an example of the "predetermined resource", and the determination that the printing medium on which printing is to be executed is insufficient is an example of the "predetermined condition" being satisfied. Further, in another variant, instead of the process of T646, the printer 10 may determine whether the status of the printer 10 is Error or not. In the present variant, the determination that the status of the printer 10 is Error is an example of the "predetermined condition" being satisfied.

(Variant 6) In each of the above-described embodiments, each process of FIGS. 2 to 8 is realized by software (e.g., programs 36, 136), however, at least one of those processes may be realized by hardware such as logic circuit.

What is claimed is:

1. An image processing device, comprising:
   an image processing engine; and
   a controller,
   wherein the controller is configured to:
   in a case where an enabling instruction is obtained under a situation where a service state of the image processing device for receiving a job providing service from a server is a disabled state, shift the service state from the disabled state to an enabled state, the enabling instruction being an instruction to cause the service state to shift to the enabled state, the disabled state being a state incapable of receiving from the server a job which is an execution instruction to execute image processing, and the enabled state being a state capable of receiving the job from the server;
   in the case where the enabling instruction is obtained under the situation where the service state is the disabled state, send an acceptance instruction to the server, the acceptance instruction being an instruction to cause the server to execute acceptance of a job sending request, the job sending request being a request to send the job to the image processing device via the server;
   in a case where the job is received from the server under a situation where the service state is the enabled state, cause the image processing engine to execute the image processing according to the job;
   in a case where a disabling instruction to cause the service state to shift to the disabled state is obtained under the situation where the service state is the enabled state, shift the service state from the enabled state to the disabled state; and
   in the case where the disabling instruction is obtained under the situation where the service state is the enabled state, send an acceptance stop instruction to the server, the acceptance stop instruction being an instruction to cause the server to stop the acceptance of the job sending request.

2. The image processing device as in claim 1, wherein the controller is further configured to:
   in the case where the disabling instruction is obtained under the situation where the service state is the enabled state, cause a display unit to display a first inquiry screen, the first inquiry screen being a screen to inquire whether the acceptance of the job sending request is to be stopped in the server,
   wherein in a case where it is selected in the first inquiry screen that the acceptance of the job sending request is to be stopped, the controller is configured to send the acceptance stop instruction, and
   in a case where it is selected in the first inquiry screen that the acceptance of the job sending request is not to be stopped, the acceptance stop instruction is not sent to the server.

3. The image processing device as in claim 1, wherein the controller is further configured to:
   under the situation where the service state is the enabled state, cause a display unit to display a second inquiry screen before the disabling instruction is obtained, the second inquiry screen being a screen to inquire whether to select a first-type of disabling instruction or a second-type of disabling instruction,
   wherein in a case where the first-type of disabling instruction is obtained in response to the first-type of disabling instruction being selected in the second inquiry screen, the controller is configured to send the acceptance stop instruction to the server, and
   in a case where the second-type of disabling instruction is obtained in response to the second-type of disabling instruction being selected in the second inquiry screen, the acceptance stop instruction is not sent to the server.

4. The image processing device as in claim 1, wherein in a case where the enabling instruction is not obtained over a predetermined period of time after the service state has been shifted from the enabled state to the disabled state in response to the disabling instruction being obtained, the controller is configured to send the acceptance stop instruction to the server.

5. The image processing device as in claim 1, wherein the controller is further configured to:
   in a case where the service state is shifted from the disabled state to the enabled state, send first status information indicating a current status of the image processing device to the server; and
   every time a status of the image processing device is changed under the situation where the service state is the enabled state, send second status information indicating the status of the image processing device as changed to the server.

6. The image processing device as in claim 1, wherein the controller is further configured to:
   in a case where a predetermined condition is satisfied even without the disabling instruction being obtained under the situation where the service state is the enabled state, send the acceptance stop instruction to the server.

7. The image processing device as in claim 6, wherein the predetermined condition is satisfied when a predetermined resource of the image processing device is equal to or less than a threshold.

8. A non-transitory computer-readable recording medium storing computer-readable instructions for an image processing device which comprises:
   an image processing engine; and
   a processor,
   wherein
   the computer-readable instructions, when executed by the processor, cause the image processing device to:
   in a case where an enabling instruction is obtained under a situation where a service state of the image processing device for receiving a job providing service from a server is a disabled state, shift the service state from the disabled state to an enabled state, the enabling instruction being an instruction to cause the service state to shift to the enabled state, the disabled state being a state incapable of receiving from the server a job which is an execution instruction to execute image processing, and the enabled state being a state capable of receiving the job from the server;
   in the case where the enabling instruction is obtained under the situation where the service state is the disabled state, send an acceptance instruction to the server, the acceptance instruction being an instruction to cause the server to execute acceptance of a job sending request, the job sending request being a request to send the job to the image processing device via the server;
   in a case where the job is received from the server under a situation where the service state is the enabled state, cause the image processing engine to execute the image processing according to the job;
   in a case where a disabling instruction to cause the service state to shift to the disabled state is obtained under the situation where the service state is the enabled state, shift the service state from the enabled state to the disabled state; and in the case where the disabling instruction is obtained under the situation where the service state is the enabled state, send an acceptance stop instruction to the server, the acceptance stop instruction being an instruction to cause the server to stop the acceptance of the job sending request.

* * * * *